United States Patent [19]
Lombardi

[11] Patent Number: 6,042,180
[45] Date of Patent: Mar. 28, 2000

[54] FOLDING CHAIR WITH FISHING ACCESSORIES

[76] Inventor: Peter Lombardi, 8249 Nichols St., Masbury, Ohio 44438

[21] Appl. No.: 09/231,374

[22] Filed: Jan. 14, 1999

[51] Int. Cl.[7] .............................. A01K 97/10; A47C 7/62
[52] U.S. Cl. ............................... 297/188.11; 297/188.01; 297/188.19; 297/217.1; 248/538
[58] Field of Search ..................... 297/39, 183.5, 297/188.01, 188.07, 188.08, 188.11, 188.13, 188.19, 217.1; 248/538

[56] References Cited

U.S. PATENT DOCUMENTS

| | | | |
|---|---|---|---|
| 879,489 | 2/1908 | Pokorny | 297/188.19 X |
| 1,403,543 | 1/1922 | Daniel | 297/188.11 X |
| 4,487,345 | 12/1984 | Pierce et al. | 297/188.07 X |
| 4,650,245 | 3/1987 | Nazar | 297/188.13 |
| 4,790,432 | 12/1988 | Rees | 297/188.11 X |
| 5,325,620 | 7/1994 | Reed et al. | 297/188.18 X |
| 5,628,544 | 5/1997 | Goodman | 297/188.19 X |
| 5,899,527 | 5/1999 | Elvidge | 297/188.01 X |

Primary Examiner—Peter R. Brown

[57] ABSTRACT

A folding chair with fishing accessories for providing several comfort enhancing features to make fishing more enjoyable. The folding chair with fishing accessories includes a seat portion with front and back ends, a pair of sides extending between the ends, and upper and lower surfaces. A backrest portion extends upwardly from the back end of the seat portion. A pair of legs are pivotally coupled to opposite sides of the seat portion towards the front end of the seat portion. Another pair of legs are pivotally coupled to opposite sides of the backrest portion towards a lower end of the backrest portion. A pair of armrests are pivotally coupled to opposite sides of the backrest portion and extend forwardly therefrom. Upper ends of the legs are pivotally coupled to the armrests.

18 Claims, 3 Drawing Sheets

FOLDING CHAIR WITH FISHING ACCESSORIES

BACKGROUND OF THE INVENTION

1. Field of the Invention

The present invention relates to chairs and more particularly pertains to a new folding chair with fishing accessories for providing several comfort enhancing features to make fishing more enjoyable.

2. Description of the Prior Art

The use of chairs is known in the prior art. More specifically, chairs heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,409,291; 3,077,327; 3,128,137; 4,103,965; 4,835,896; and U.S. Pat. No. Des. 341,261.

While these devices fulfill their respective, particular objectives and requirements, the aforementioned patents do not disclose a new folding chair with fishing accessories. The inventive device includes a seat portion with front and back ends, a pair of sides extending between the ends, and upper and lower surfaces. A backrest portion extends upwardly from the back end of the seat portion. A pair of legs are pivotally coupled to opposite sides of the seat portion towards the front end of the seat portion. Another pair of legs are pivotally coupled to opposite sides of the backrest portion towards a lower end of the backrest portion. A pair of armrests are pivotally coupled to opposite sides of the backrest portion and extend forwardly therefrom. Upper ends of the legs are pivotally coupled to the armrests. The seat portion, the backrest portion, and the legs are positionable between a deployed position and a folded position. The seat portion and the backrest portion are oriented generally perpendicular each other when in the deployed position. The seat portion, backrest portion, and legs are oriented generally parallel each other when in the folded position.

In these respects, the folding chair with fishing accessories according to the present invention substantially departs from the conventional concepts and designs of the prior art, and in so doing provides an apparatus primarily developed for the purpose of providing several comfort enhancing features to make fishing more enjoyable.

SUMMARY OF THE INVENTION

In view of the foregoing disadvantages inherent in the known types of chairs now present in the prior art, the present invention provides a new folding chair with fishing accessories construction wherein the same can be utilized for providing several comfort enhancing features to make fishing more enjoyable.

The general purpose of the present invention, which will be described subsequently in greater detail, is to provide a new folding chair with fishing accessories apparatus and method which has many of the advantages of the chairs mentioned heretofore and many novel features that result in a new folding chair with fishing accessories which is not anticipated, rendered obvious, suggested, or even implied by any of the prior art chairs, either alone or in any combination thereof.

To attain this, the present invention generally comprises a seat portion with front and back ends, a pair of sides extending between the ends, and upper and lower surfaces. A backrest portion extends upwardly from the back end of the seat portion. A pair of legs are pivotally coupled to opposite sides of the seat portion towards the front end of the seat portion. Another pair of legs are pivotally coupled to opposite sides of the backrest portion towards a lower end of the backrest portion. A pair of armrests are pivotally coupled to opposite sides of the backrest portion and extend forwardly therefrom. Upper ends of the legs are pivotally coupled to the armrests. The seat portion, the backrest portion, and the legs are positionable between a deployed position and a folded position. The seat portion and the backrest portion are oriented generally perpendicular each other when in the deployed position. The seat portion, backrest portion, and legs are oriented generally parallel each other when in the folded position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new folding chair with fishing accessories apparatus and method which has many of the advantages of the chairs mentioned heretofore and many novel features that result in a new folding chair with fishing accessories which is not anticipated, rendered obvious, suggested, or even implied by any of the prior art chairs, either alone or in any combination thereof.

It is another object of the present invention to provide a new folding chair with fishing accessories which may be easily and efficiently manufactured and marketed.

It is a further object of the present invention to provide a new folding chair with fishing accessories which is of a durable and reliable construction.

An even further object of the present invention is to provide a new folding chair with fishing accessories which is susceptible of a low cost of manufacture with regard to both materials and labor, and which accordingly is then susceptible of low prices of sale to the consuming public, thereby making such folding chair with fishing accessories economically available to the buying public.

Still yet another object of the present invention is to provide a new folding chair with fishing accessories which provides in the apparatuses and methods of the prior art some of the advantages thereof, while simultaneously overcoming some of the disadvantages normally associated therewith.

Still another object of the present invention is to provide a new folding chair with fishing accessories for providing several comfort enhancing features to make fishing more enjoyable.

Yet another object of the present invention is to provide a new folding chair with fishing accessories which includes a seat portion with front and back ends, a pair of sides extending between the ends, and upper and lower surfaces. A backrest portion extends upwardly from the back end of the seat portion. A pair of legs are pivotally coupled to opposite sides of the seat portion towards the front end of the seat portion. Another pair of legs are pivotally coupled to opposite sides of the backrest portion towards a lower end of the backrest portion. A pair of armrests are pivotally coupled to opposite sides of the backrest portion and extend forwardly therefrom. Upper ends of the legs are pivotally coupled to the armrests. The seat portion, the backrest portion, and the legs are positionable between a deployed position and a folded position. The seat portion and the backrest portion are oriented generally perpendicular each other when in the deployed position. The seat portion, backrest portion, and legs are oriented generally parallel each other when in the folded position.

Still yet another object of the present invention is to provide a new folding chair with fishing accessories that permits a user to transport fishing gear and other items to remote locations, eliminating the need to carry along a separate chair and tackle box.

Even still another object of the present invention is to provide a new folding chair with fishing accessories that includes a carrying strap for permitting hands-free transportation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
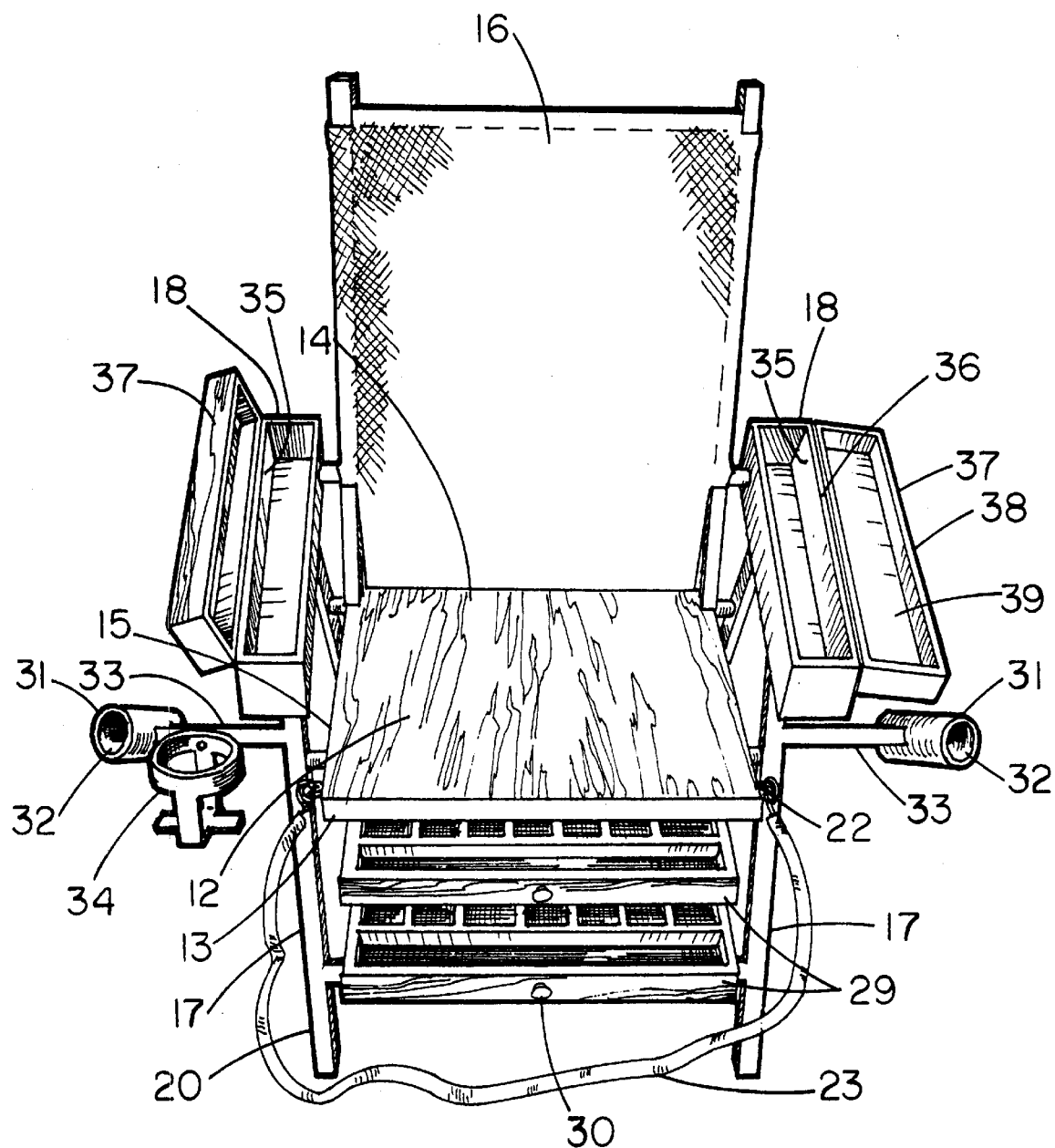
FIG. 1 is a schematic perspective front view of a new folding chair with fishing accessories according to the present invention.
Figure 2:
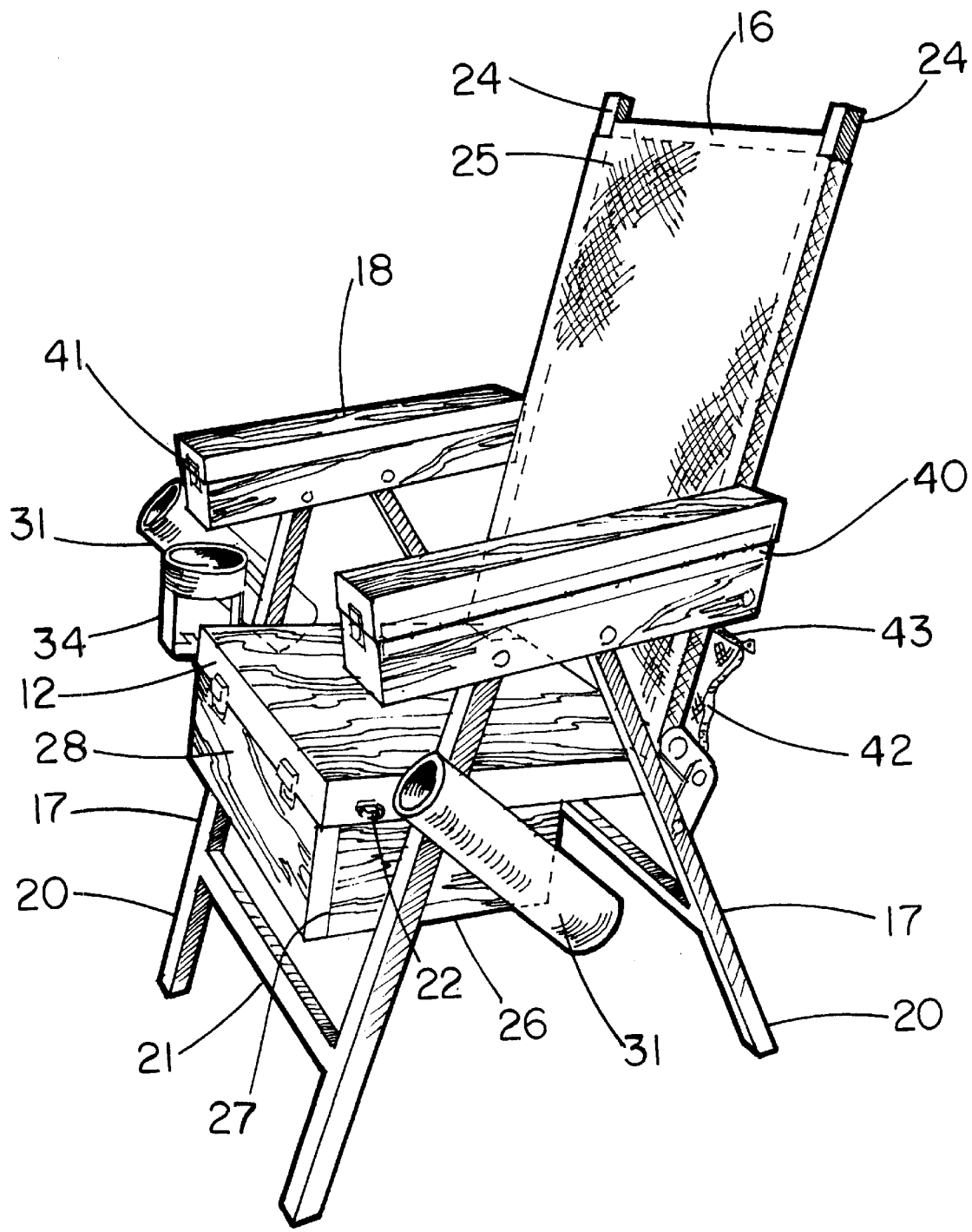
FIG. 2 is a schematic perspective side view of the present invention.
Figure 3:
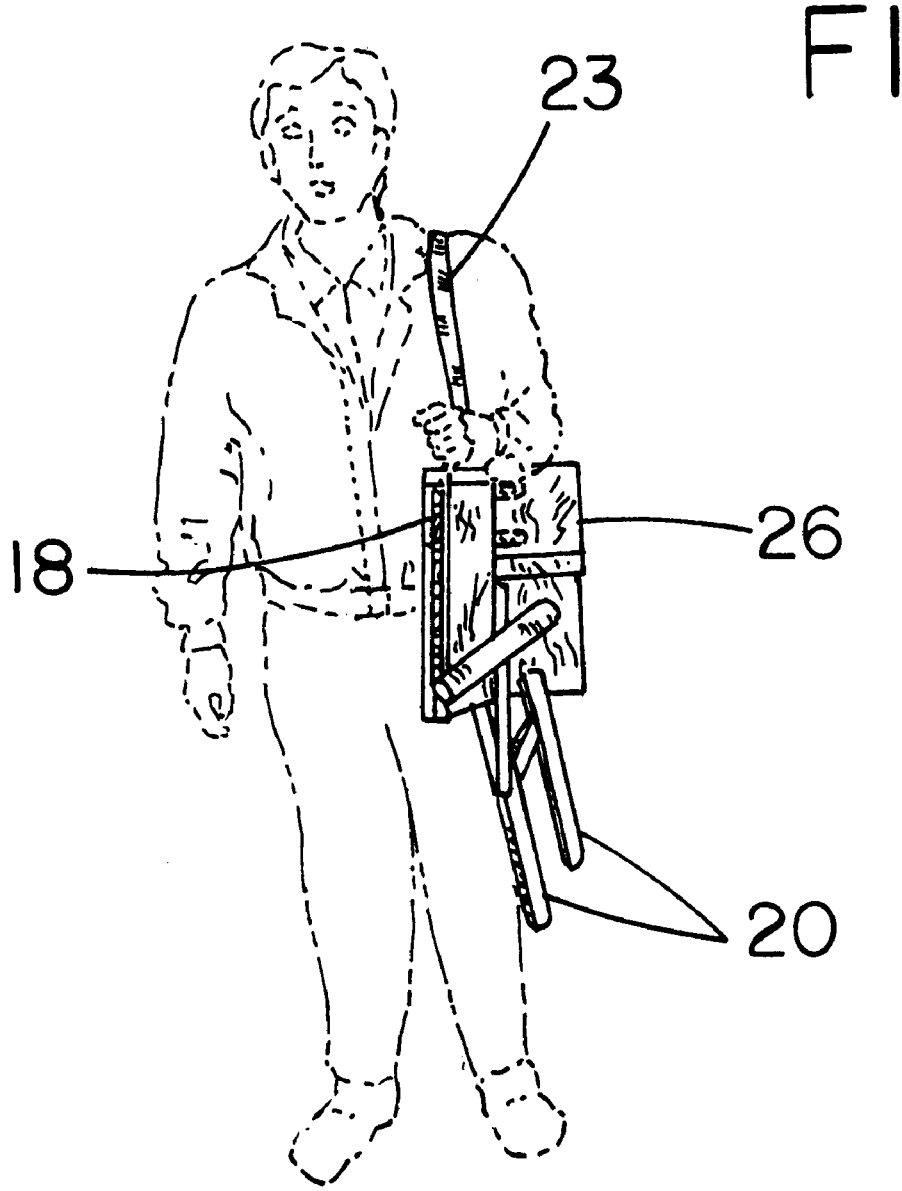
FIG. 3 is a schematic side view of the present invention in a folded orientation.

With reference now to the drawings, and in particular to FIGS. 1 through 3 thereof, a new folding chair with fishing accessories embodying the principles and concepts of the present invention and generally designated by the reference numeral 10 will be described.

As best illustrated in FIGS. 1 through 3, the folding chair with fishing accessories 10 generally comprises a seat portion 12 with front and back ends 13,14, a pair of sides 15 extending between the ends, and upper and lower surfaces. A backrest portion 16 extends upwardly from the back end of the seat portion. A pair of legs 17 are pivotally coupled to opposite sides of the seat portion towards the front end of the seat portion. Another pair of legs are pivotally coupled to opposite sides of the backrest portion towards a lower end of the backrest portion. A pair of armrests 18 are pivotally coupled to opposite sides of the backrest portion and extend forwardly therefrom. Upper ends of the legs are pivotally coupled to the armrests. The seat portion, the backrest portion, and the legs are positionable between a deployed position and a folded position. The seat portion and the backrest portion are oriented generally perpendicular each other when in the deployed position. The seat portion, backrest portion, and legs are oriented generally parallel each other when in the folded position. Preferably, the seat portion and backrest portion are generally rectangular.

A pair of generally H-shaped support portions 20 each have a pair of spaced apart legs 17 and a cross member 21 extending between the legs of the respective support portion. The legs of one of the support portions are pivotally coupled to opposite sides of the seat portion towards the front end of the seat portion. The legs of another of the support portions are pivotally coupled to opposite sides of the backrest portion towards a lower end of the backrest portion.

Preferably, the seat portion has a pair of eyelets 22 extending from the sides of the seat portion. Free ends of a carrying strap 23 are releasably coupled to the eyelets. The carrying strap is designed to fit over a user's shoulder to permit hands-free carrying of the chair when the chair is in the folded orientation. The carrying strap may be length adjustable.

Also preferably, the seat portion comprises a resilient material for greater durability. Ideally, the seat portion comprises wood or plastic for resisting thermal transfer to or from the body of a user seated thereon.

Preferably, the backrest portion comprises a pair of spaced apart lateral members 24 and a flexible cloth portion 25 extending between the lateral members. Ideally, the cloth portion comprises canvas.

Also preferably, a tackle housing 26 extends from the lower surface of the seat portion. The tackle housing has a front opening 27 and a door 28 for selectively closing the tackle housing. Preferably, the door is detachably coupled to the front end of the seat portion.

The tackle housing has a pair of drawers 29 slidably disposed therein. More preferably, each of the drawers has a plurality of compartments therein adapted for receiving fishing tackle, equipment, tools, and the like. Ideally, each of the drawers has a generally circular knob 30 extending from a front side thereof.

A pair of rod holders 31 each have a tubular rod receiving portion 32 and an extension member 33. The extension members are coupled to the legs of one of the support portions. The rod receiving portions are each adapted to receive a handle of a fishing rod therein. One of the extension members of the rod holders has a drink holder 34 coupled to it. The drink holder is adapted for holding a beverage container such as a soft drink can.

Preferably, each of the armrests has a channel 35 extending into it, an open top 36 defining an opening into the channel, and a lid 37 for closing the open top. More preferably, each of the lids has a peripheral sidewall 38 and a panel 39 that extends across an upper edge of the peripheral sidewall. Ideally, the peripheral sidewalls of the lids are pivotally coupled to outer portions of the open tops of the armrests by a hinge 40. Also ideally, each of the armrests has a lock 41 to lock the lid shut.

Also preferably, the backrest portion has a creel pouch 42 coupled to it that extends between the lateral members of the backrest portion. The creel pouch is adapted for receiving fish therein. Ideally, the creel pouch has a zippered top 43 providing a closeable opening into the creel pouch.

In an exemplary embodiment, with the chair in the deployed position, the height of the chair between horizontal planes extending across uppermost and lowermost portions of the chair is between about 30 and 40 inches, ideally about 35½ inches. The length of the seat portion between its front and back ends is between about 10 and 18 inches, ideally about 14⅝ inches. The width of the seat portion between its outer sides is between about 12 and 23 inches, ideally about 17½ inches.

In use, fishing gear is placed in the drawers of the tackle housing. The chair is placed in the folded position. The carrying strap is placed over the user's shoulder and the chair is carried to a remote location, such as on the bank along a body of water. The chair is placed in the deployed position and the user sits on the seat portion. A handle of a fishing rod is inserted in one of the rod holders. A beverage container is placed in the drink holder. The drawers may of the tackle housing may be accessed by the user while seated. Fish may be placed in the creel pouch of the backrest portion.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A chair, comprising:
    a seat portion having front and back ends, a pair of sides extending between said ends, and upper and lower surfaces;
    a backrest portion extending upwardly from said back end of said seat portion;
    a pair of legs being pivotally coupled to opposite sides of said seat portion towards said front end of said seat portion, another pair of legs being pivotally coupled to opposite sides of said backrest portion towards a lower end of said backrest portion;
    a pair of armrests being pivotally coupled to opposite sides of said backrest portion and extending forwardly therefrom;
    upper ends of said legs being pivotally coupled to said armrests;
    said seat portion, said backrest portion, and said legs being positionable between a deployed position and a folded position, said seat portion and said backrest portion being oriented generally perpendicular each other when in said deployed position, said seat portion, backrest portion, and legs being oriented generally parallel each other when in said folded position; and
    a pair of rod holders having a tubular rod receiving portion and an extension member, said extension members being coupled to a pair of said legs, said rod receiving portions being adapted for receiving a handle of a fishing rod therein, one of said extension members of said rod holders having a drink holder coupled thereto, said drink holder being adapted for holding a beverage container.

2. The chair of claim 1, wherein said seat portion has a pair of eyelets extending from said sides of said seat portion, free ends of a carrying strap being releasably coupled to said eyelets.

3. The chair of claim 1, further comprising a tackle housing extending from said lower surface of said seat portion, said tackle housing having a front opening and a door for selectively closing said tackle housing.

4. The chair of claim 3, wherein said door of said tackle housing is detachably coupled to said front end of said seat portion.

5. The chair of claim 3, wherein said tackle housing has a pair of drawers slidably disposed therein, each of said drawers having a plurality of compartments therein adapted for receiving fishing tackle.

6. The chair of claim 1, wherein each of said armrests has a channel extending therein, an open top defining an opening into said channel, and a lid for closing said open top.

7. The chair of claim 6 wherein each of said lids of said armrests has a peripheral sidewall and a panel extending across said peripheral sidewall, said peripheral sidewalls of said lids being pivotally coupled to outer portions of said open tops of said armrests.

8. The chair of claim 1, wherein said backrest portion has a creel pouch coupled thereto and extending between said lateral members of said backrest portion, said creel pouch being adapted for receiving fish therein.

9. The chair of claim 8, wherein said creel pouch has a zippered top providing an opening into said creel pouch.

10. A chair, comprising:
    a generally rectangular seat portion having front and back ends, a pair of sides extending between said ends, and upper and lower surfaces;
    a generally rectangular backrest portion extending upwardly from said back end of said seat portion;
    a pair of generally H-shaped support portions each having a pair of spaced apart legs and a cross member extending between said legs of the respective support portion, said legs of one of said support portions being pivotally coupled to opposite sides of said seat portion towards said front end of said seat portion, said legs of another of said support portions being pivotally coupled to opposite sides of said backrest portion towards a lower end of said backrest portion;

a pair of armrests being pivotally coupled to opposite sides of said backrest portion and extending forwardly therefrom;

upper ends of said legs of said support portions being pivotally coupled to said armrests;

said seat portion, said backrest portion, and said support portions being positionable between a deployed position and a folded position, said seat portion and said backrest portion being oriented generally perpendicular each other when in said deployed position, said support portions being oriented at an acute angle to each other when in said deployed position, said seat portion, backrest portion, and support portions being oriented generally parallel each other when in said folded position;

said seat portion having a pair of eyelets extending from said sides of said seat portion;

a carrying strap, free ends of said carrying strap being releasably coupled to said eyelets;

said seat portion comprising a resilient material;

said backrest portion comprising a pair of spaced apart lateral members and a flexible cloth portion extending between said lateral members;

a tackle housing extending from said lower surface of said seat portion, said tackle housing having a front opening and a door for selectively closing said tackle housing;

said door being detachably coupled to said front end of said seat portion;

said tackle housing having a pair of drawers slidably disposed therein, each of said drawers having a plurality of compartments therein adapted for receiving fishing tackle;

each of said drawers having a generally circular knob extending from a front side thereof;

a pair of rod holders having a tubular rod receiving portion and an extension member, said extension members being coupled to said legs of one of said support portions, said rod receiving portions being adapted for receiving a handle of a fishing rod therein;

one of said extension members of said rod holders having a drink holder coupled thereto, said drink holder being adapted for holding a beverage container;

each of said armrests having a channel extending therein, an open top defining an opening into said channel, and a lid for closing said open top;

each of said lids having a peripheral sidewall and a panel extending across said peripheral sidewall, said peripheral sidewalls of said lids being pivotally coupled to outer portions of said open tops of said armrests; and said backrest portion having a creel pouch coupled thereto and extending between said lateral members of said backrest portion, said creel pouch being adapted for receiving fish therein;

said creel pouch having a zippered top providing an opening into said creel pouch.

11. A chair, comprising:

a seat portion having front and back ends, a pair of sides extending between said ends, and upper and lower surfaces;

a backrest portion extending upwardly from said back end of said seat portion;

a pair of legs being pivotally coupled to opposite sides of said seat portion towards said front end of said seat portion, another pair of legs being pivotally coupled to opposite sides of said backrest portion towards a lower end of said backrest portion;

a pair of armrests being pivotally coupled to opposite sides of said backrest portion and extending forwardly therefrom;

upper ends of said legs being pivotally coupled to said armrests;

said seat portion, said backrest portion, and said legs being positionable between a deployed position and a folded position, said seat portion and said backrest portion being oriented generally perpendicular each other when in said deployed position, said seat portion, backrest portion, and legs being oriented generally parallel each other when in said folded position; and at least one rod holder having a tubular rod receiving portion and an extension member, said extension member being coupled to one of said legs, said rod receiving portion being adapted for receiving a handle of a fishing rod therein, said extension member of said rod holder having a drink holder coupled thereto, said drink holder being adapted for holding a beverage container.

12. The chair of claim 11, wherein said seat portion has a pair of eyelets extending from said sides of said seat portion, free ends of a carrying strap being releasably coupled to said eyelets.

13. The chair of claim 11, further comprising a tackle housing extending from said lower surface of said seat portion, said tackle housing having a front opening and a door for selectively closing said tackle housing.

14. The chair of claim 13, wherein said door of said tackle housing is detachably coupled to said front end of said seat portion.

15. The chair of claim 13, wherein said tackle housing has a pair of drawers slidably disposed therein, each of said drawers having a plurality of compartments therein adapted for receiving fishing tackle.

16. The chair of claim 11, wherein each of said armrests has a channel extending therein, an open top defining an opening into said channel, and a lid for closing said open top.

17. The chair of claim 16, wherein each of said lids of said armrests has a peripheral sidewall and a panel extending across said peripheral sidewall, said peripheral sidewalls of said lids being pivotally coupled to outer portions of said open tops of said armrests.

18. The chair of claim 11, wherein said backrest portion has a creel pouch coupled thereto and extending between said lateral members of said backrest portion, said creel pouch being adapted for receiving fish therein.

* * * * *